US011035342B2

(12) United States Patent
Elosegui Insausti et al.

(10) Patent No.: US 11,035,342 B2
(45) Date of Patent: Jun. 15, 2021

(54) METHOD FOR CALCULATING AND CORRECTING THE ANGLE OF ATTACK IN A WIND TURBINE FARM

(71) Applicant: HISPAVISTA LABS, A.I.E., San Sebastián (ES)

(72) Inventors: Unai Elosegui Insausti, San Sebastián (ES); Jon Elosegui Insausti, San Sebastián (ES)

(73) Assignee: HISPAVISTA LABS, A.I.E., San Sebastián (ES)

( * ) Notice: Subject to any disclaimer, the term of this patent is extended or adjusted under 35 U.S.C. 154(b) by 546 days.

(21) Appl. No.: 14/437,182

(22) PCT Filed: Oct. 29, 2013

(86) PCT No.: PCT/ES2013/070752
§ 371 (c)(1),
(2) Date: Apr. 20, 2015

(87) PCT Pub. No.: WO2014/068162
PCT Pub. Date: May 8, 2014

(65) Prior Publication Data
US 2015/0285221 A1 Oct. 8, 2015

(30) Foreign Application Priority Data

Oct. 31, 2012 (ES) ................................ ES201231674
Oct. 17, 2013 (ES) ................................ ES201331531

(51) Int. Cl.
*F03D 7/04* (2006.01)
*F03D 7/02* (2006.01)

(52) U.S. Cl.
CPC ........... *F03D 7/0224* (2013.01); *F03D 7/048* (2013.01); *F05B 2240/96* (2013.01);
(Continued)

(58) Field of Classification Search
CPC .... F03D 7/0224; F03D 7/048; F05B 2240/96; F05B 2260/70
See application file for complete search history.

(56) References Cited

U.S. PATENT DOCUMENTS 6,724,097 B1 *  4/2004  Wobben ................. F03D 9/257
290/44
7,052,232 B2 *  5/2006  Wobben ................ B64C 27/008
415/118

(Continued)

FOREIGN PATENT DOCUMENTS

| AU | 2011201621 | 9/2012 |
| DE | 202007008066 | 11/2008 |
| ES | 2381094 | 5/2012 |

OTHER PUBLICATIONS

Extended European Search Report dated Jul. 21, 2016, EP Appln. No. 13850855.1, 8 page.

*Primary Examiner* — Eldon T Brockman
*Assistant Examiner* — Michael L Sehn
(74) *Attorney, Agent, or Firm* — Womble Bond Dickinson (US) LLP

(57) ABSTRACT

The invention relates to a method for measuring and correcting the angle of attack in a wind turbine farm (11), by which means the yield of each wind turbine (11) of the wind farm is measured initially in order to be able to define a model wind turbine which will be the one which generates the maximum power. The creation of coordinate axes for each blade (15) of the wind turbine (10) allows the angle of attack of the blades (15) of said model wind turbine (10) to be calculated and a reference value to be defined in order to copy same to each blade (15) of the rest of the wind turbines (11), in such a way that the optimum power ratio is obtained for each wind turbine of the wind farm.

11 Claims, 4 Drawing Sheets

(52) U.S. Cl.
CPC ..... *F05B 2260/70* (2013.01); *F05B 2260/821* (2013.01); *Y02E 10/72* (2013.01)

(56) References Cited

U.S. PATENT DOCUMENTS

| | | | |
|---|---|---|---|
| 8,261,599 B2* | 9/2012 | Jeffrey | F03D 13/35 415/1 |
| 2004/0013524 A1 | 1/2004 | Wobben | |
| 2004/0258521 A1 | 12/2004 | Wobben | |
| 2007/0036659 A1* | 2/2007 | Hibbard | B29C 63/22 416/233 |
| 2011/0206511 A1 | 8/2011 | Frydendal | |
| 2012/0211986 A1* | 8/2012 | Bertolotti | F03D 7/042 290/44 |

* cited by examiner

METHOD FOR CALCULATING AND CORRECTING THE ANGLE OF ATTACK IN A WIND TURBINE FARM

CROSS-REFERENCE TO RELATED APPLICATIONS

The present patent application is a national phase application of International Application No. PCT/ES2013/070752, filed Oct. 29, 2013, which claims priority to Spanish Application No. P201231674, filed Oct. 31, 2012, and Spanish Application No. P201331531, filed Oct. 17, 2013, the disclosures of which are incorporated herein by reference.

FIELD OF THE INVENTION

The present invention relates to a method for measuring and adjusting the angle of incidence of the wind on the blades of wind turbines of a farm, which is known as the angle of attack. The angle of attack bears particular importance in the yield of wind turbines, so having a method of adjustment when installing the wind turbines of a wind farm is essential.

The present invention is particularly applicable in the field of the renewable energy industry.

BACKGROUND

When installing farms for generating wind power by means of wind turbines, there is an initial problem of installing blades in the wind turbine with the suitable reference angle of attack defined in the building plans and in operating conditions. In other words, when the control system of the wind turbine indicates 0°, for example, it must be assured that the section of the blade in which 0° has been defined actually has that angle of attack.

This angle used as a reference for the blades often has differences with respect to the design angle for which the wind turbine is designed and with which optimal yield is obtained. Due to the difficulty in handling parts with such enormous dimensions and tonnage, installing them requires a degree of precision that is hard to achieve when installing blades in wind turbines. These adjustments are factory preset by means of respective marks on both the blades and the hub.

There are certain mechanical elements in the hub which allow varying the angle of incidence of the blades with the wind, said angle also being known as the angle of attack or also pitch. To that end, these systems make the blade rotate about its own longitudinal axis.

In the current state of the art, pitch control systems use primarily two technologies: hydraulic and electric technologies. Hydraulic pitch is commonly used in wind turbines. Electric pitch is being used increasingly more in high-powered wind turbine installations, because they offer better features than hydraulic systems regarding regulation and control.

Electric control systems allow continuously regulating the angle of attack of the blades, although they do not indicate the value at which they must be positioned in order to optimize their position.

The pitch control system is commonly used to limit the rated power of wind turbines when the force of the wind exceeds a specific design level. To prevent the blades or even the wind turbine itself from breaking, this received power is limited primarily by means of two systems. One of such means is by modifying the pitch such that the angle of attack of the blades with respect to the direction of the wind is reduced, even being nil for extreme wind speed situations, the blades in this case being placed in a flag position. The other system is by using a brake on the rotation of the blades. Despite initially costing more, this method has the advantage of allowing operation of the wind turbine, even in extreme wind situations, because the blades rotate at the speed at which they have been limited through the brake. It is used in installations in which blades are fixed and pitch cannot be regulated.

The following two patent documents can be mentioned as the state of the art closest to the present invention.

Patent document AU2011201621A1 discloses a wind turbine in which the blades can rotate about their axes. Therefore, by varying the angle of the blades in relation to the direction of the wind, the most favorable position for maximizing generated power can be obtained.

Patent document ES2381094A1 discloses a method for monitoring the yield of a wind turbine in which the blades can likewise rotate about their axes, following a power curve with respect to speed of the generator depending on wind speed.

In both patent documents, the optimal value at which the blades must be placed can be known by conducting tests for the different pitch angles.

However, in these cases the way of adjusting blades in the wind turbine during installation and the position in which blades remain once they have been installed is based on preset marks, but no final calibration measurement is taken which assures that the blades are in the correct position. Therefore, if the blades are installed with different angles between one another or at a value that does not correspond to the optimal pitch in the initial installation of a wind turbine, this situation will stay like that throughout the lifetime of the wind turbine, and any subsequent monitoring or adjustments made to pitch will not be correctly referenced.

A method that is used today to try to solve (always after the fact) the problem of having all the blades in the same relative position and with the absolute angle that is identical to that designed is to use a method based on measuring by means of photographs (which is primarily used when the problem is visually evident or when there is a serious problem with wind turbine yield, and it is always after the fact). Therefore, the relative position of the different blades of a wind turbine is determined by means of the position in which the different blades are seen in these photographs. The plans of the blades and the maximum chord pitch of the blade indicated in said plans are compared with that which is seen in the photograph and absolute deviation of the blade is determined. This method is fairly rudimentary and offers very little measurement precision, in addition to being completely useless for offshore wind farms, in which photographs must be taken on a floating platform which furthermore adds lack of precision as regards its position and movement.

The present invention solves these problems, disclosing a process for measuring and correcting the optimal pitch for orienting the blades of wind turbines in the installation of a new wind farm or in the later inspection of the blades in a wind turbine.

SUMMARY

The present invention discloses a method for measuring and correcting the angle of attack in a wind turbine farm comprising a tower, a nacelle, a hub and blades, where the power generated by each wind turbine of the farm is measured such that a model wind turbine is defined as the wind turbine that generates the most power. A coordinate system GXYZ is created in a first blade of the model wind turbine, defined by an X axis, a Y axis, a Z axis and an origin G. The angle formed between a straight line formed by two known points of the blade and the Y axis is then calculated, obtaining a reference angle ($\alpha$). The angle of attack is calculated as the complementary angle of this reference angle.

The steps listed below are followed to generate the reference coordinate system GXYZ:

measuring at least three points of the front face of the nacelle where it is attached to the hub, defining an AB plane, measuring at least three points of the circumferential contour of attachment of the first blade to the hub, defining a circular section the center G of which is the origin of the coordinate system of this first blade, defining the X axis as an axis that is perpendicular to the circular section and passes through the origin G, defining the Y axis as an axis that is perpendicular to the X axis, that is parallel to the AB plane and passes through the origin G, defining a third Z axis as an axis that is perpendicular to the previously defined X axis and Y axis and passes through the origin G.

A reference coordinate system GXYZ is subsequently created in the remaining blades of the model wind turbine such that a coordinate system is defined in each blade of the model wind turbine.

Measurements of a series of points defining the cross-section of the first blade are taken in the first blade of the model wind turbine at a distance from the origin G in the direction of the X axis in order to thereby obtain the position of two points of the first blade, the straight line joining these two points being a reference straight line.

There are cases in which the distance from the origin G on the X axis of the first blade at which there is located the cross-section in which a value of the reference angle is known is provided in the plans of the blades of the wind turbine.

In this case, if the cross-section of the first blade is symmetrical, the two points are the mid-point of the leading edge of the blade and trailing edge of the blade, the straight line joining these two points being the chord, coinciding with the axis of symmetry of the blade. If the cross-section of the first blade is asymmetrical but the chord is known through the plans of the wind turbine, the chord is obtained by plotting on the section of the first blade an arc of circumference with its center in the trailing edge and with a radius, the value of this chord being shown in the plans, the resulting chord being the line going from this center to the cut-off point of the arc of circumference with the circumference of the leading edge.

If there is no available information about the values of angles or chords in particular, if the cross-section of the first blade is asymmetrical, two known points at any one distance from the origin G on the X axis of the first blade in a cross-section are measured in order to calculate a reference straight line. These points are the center of the circumference of the leading edge in the cross-section of the first blade, and the point of this section belonging to the X axis, or in other words, the projection of the origin G in this section.

In all the cases described above, it has been considered that the blade of the wind turbine describes a perfect attachment in the leading edge, being defined in a cross-section by a circular curve on the basis of which all the parameters involved in the search for references that can be worked with are defined.

However, a case of manufacture in which the blade is created from two longitudinally attached shells has not been considered. In these cases, the attachment of two shells forming the blade is demarcated in a cross-section of the blade along its leading edge by means of a curve that is not circular.

In this case, and considering the most general case in which the cross-section of the blade is asymmetrical, two known points at any one distance from the origin G on the X axis of the first blade in a cross-section are measured in order to calculate a reference straight line. These points are the point belonging to the X axis in the cross-section of the first blade, or in other words, the projection of the origin G in this section, and the point of tangency of a plotted circumference, centered on the previous point, with the leading edge of the blade. This reference straight line thereby defines a reference angle with the Y axis, the complementary angle of which is the angle of attack of the first blade.

Once the value of the reference angle in the first blade has been determined, the reference angle in the remaining blades of the model wind turbine is measured. In the case in which all the blades of the model wind turbine have values other than the reference angle, it is considered a model reference angle given by the arithmetic mean of the values of the reference angles calculated for all the blades of the model wind turbine. When at least two of the blades of the model wind turbine have the same value as the reference angle, this value is considered a model reference angle.

Once the value of the model reference angle has been determined, the reference angle is measured in each blade of a new wind turbine at the same distance from the origin G in the direction of the axis, and it is adjusted in all the blades until being positioned with the same value of the model reference angle.

Finally, the value of the reference angle of all the blades of the rest of the wind turbines of the wind farm is measured and adjusted until being positioned with the same value of the model reference angle.

BRIEF DESCRIPTION OF THE DRAWINGS

To complete the invention being described and for the purpose of aiding to better understand the features of the described method, a set of drawings is attached in which the following is depicted with an illustrative and non-limiting character.

Figure 1:
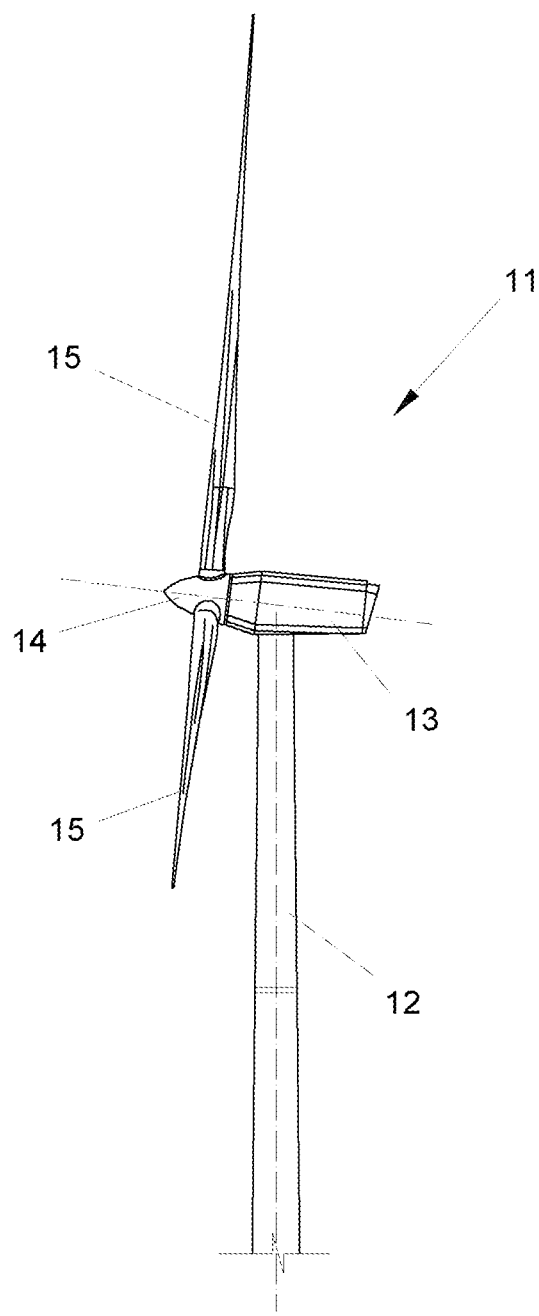
FIG. 1 depicts a side view of a wind turbine.

A list of the reference numbers used in the drawings is provided below:

1—X axis

2—Y axis

3—Z axis
4—Circular section
5—AB plane
6—Circumference of the leading edge
7—Chord
G—Origin of the coordinate system of each blade
D—Any distance from the origin G along the X axis of a blade
α—Reference angle
$\alpha_m$—Model reference angle
10—Model wind turbine, the wind turbine that generates maximum power
11—Normal wind turbine
12—Tower
13—Nacelle
14—Hub
15—Blades
21—Leading edge
22—Trailing edge
23—Center of the circumference of the leading edge
24—Intersection of the X axis with the section of the blade
25—Reference straight line of the blade
26—Point of tangency in the leading edge of the blade
27—Point belonging to the leading edge

DETAILED DESCRIPTION

The present invention relates to a method for measuring and regulating pitch in wind turbines. To illustrate the present invention a type of wind turbine (11) having three blades (15) has been chosen, although this must not be interpreted as limiting, rather it is simply a way of describing the invention that provides clarity to the description.

For the sake of simplifying and making the description easier to understand, a wind farm has not been depicted in any of the drawings as it is understood that it does not provide clarity. However, two types of wind turbines have been distinguished in the wind farm. One is the normal wind turbine (11) and the other is the model wind turbine (10), represented by the wind turbine that generates maximum power in the wind farm. Both are identical with the exception of the relative position of their blades (15), which make them generate more or less power.

A wind turbine (11) with three blades (15) and its most representative components is depicted in FIG. 1.

Figure 2:
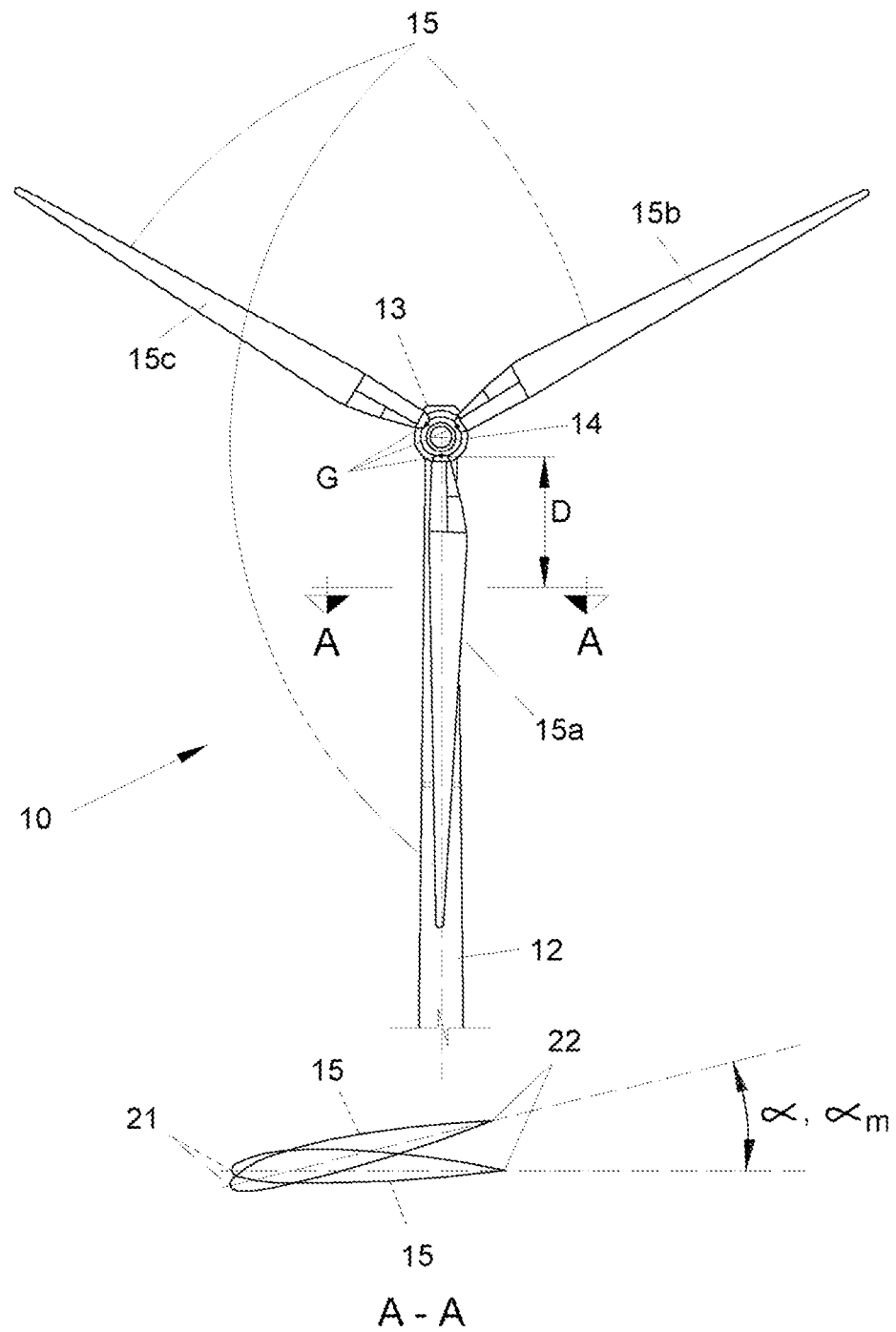
FIG. 2 depicts a front view of a wind turbine.

FIG. 2 shows a front view of the model wind turbine (10) with a section of the blade (15) in two positions of the blade (15) having different angles (α, $\alpha_m$). The model wind turbine (10) is the wind turbine that generates maximum power out of all the wind turbines (11) in the farm and is identical to the others.

This drawing shows how the blades of the wind turbine (10, 11) in general are indicated with reference number 15, references 15a, 15b, 15c, etc., specifically referring to a first blade, a second blade, a third blade, and so on and so forth, for all the blades (15) that the wind turbine (11) may have.

A section of the blade (15) at a distance (D) in two positions of the blade has also been depicted, the angle between these two positions being indicated as a for a typical position and $\alpha_m$ for a model position.

Figure 3:
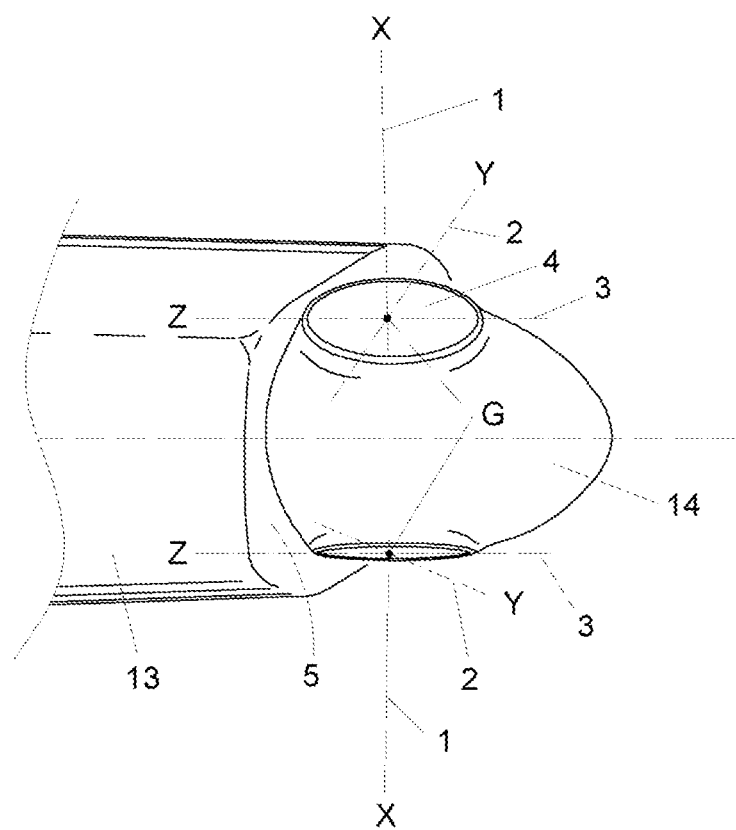
FIG. 3 depicts a perspective view of a hub attached to a nacelle.

A hub can be seen in FIG. 3, in which is shown the area of attachment of the nacelle (13) to the hub (14) and the surface of the hub (14) in which the blades (15) are attached, showing the reference coordinate axis system created for each blade (15).

Figure 4:
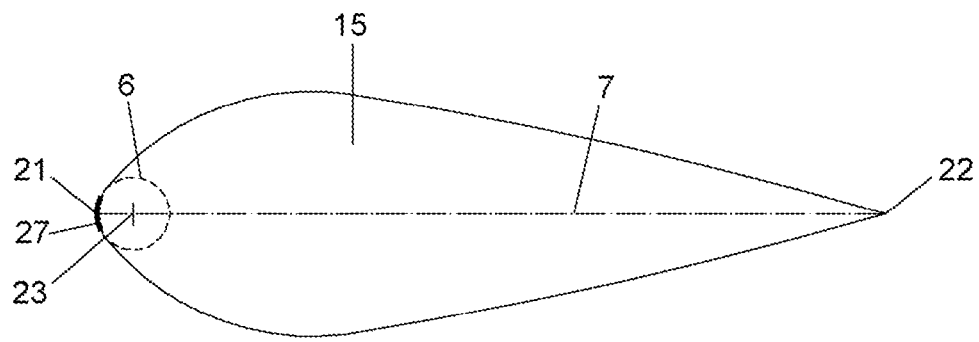
FIG. 4 depicts a section view of a symmetrical blade of a wind turbine.

FIG. 4 depicts a cross-section of a symmetrical blade (15) in which the circumference tangentially created in the inner part with respect to the edge of the blade (15) passing through the leading edge (21) or circumference (6) of the leading edge can be seen.

Figure 5:
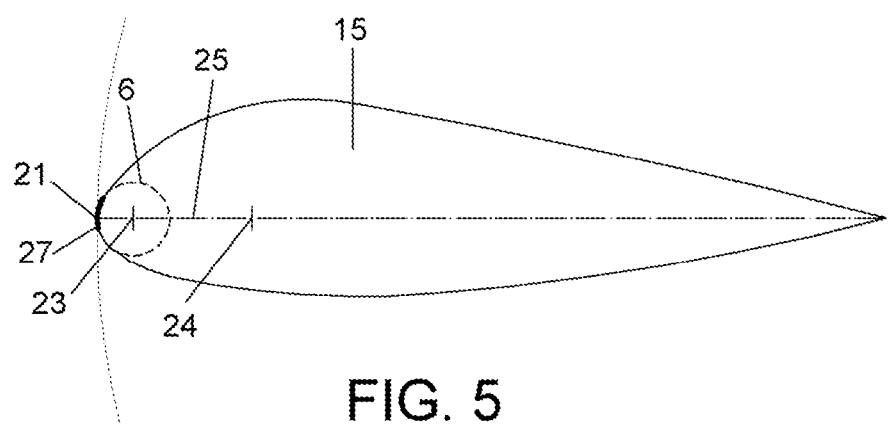
FIG. 5 depicts a section view of an asymmetrical blade of a wind turbine.

FIG. 5 depicts a cross-section of an asymmetrical blade (15) in which the tangential circumference in the inner part with respect to the edge of the blade (15) passing through the leading edge (21) in the section of the blade (15), or circumference (6) of the leading edge, can also be seen, the center (23) of which is a known point, and an arc of circumference having a radius that is the length of the chord (7), which is known from the plans of the wind turbine (11), and with the center in the trailing edge (22) of the blade (15). The leading edge (21), the point of intersection (24) of the X axis with the section of the blade (15) and the reference straight line (25) joining them have likewise been depicted.

Figure 6:
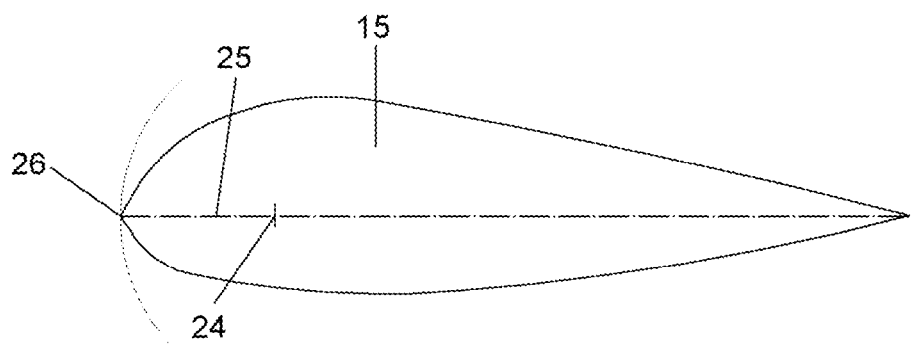
FIG. 6 depicts a section view of an asymmetrical blade of a wind turbine formed by two longitudinally attached shells.

FIG. 6 depicts a cross-section of a blade (15) formed by two longitudinally attached shells, in which the tangential circumference with respect to the leading edge of the blade (15) with the center at the point of intersection (24) of the X axis with the section of the blade (15), or in other words, the projection of the origin G onto the section of the blade (15), can be seen.

To measure and correct the pitch angles of the blades (15), a coordinate system is initially defined for each blade (15) of all the wind turbines (10, 11) of the wind farm.

Measurements are taken with laser equipment connected to an electronic data processing system.

To start, at least three points of the front face of the nacelle (13) where it is attached to the hub (14) are used. An AB plane (5) is thereby defined.

At least three points of the area of attachment of the blade (15) to the hub (14) are measured, so a circular section (4) of the blade (15) in which the center G is the origin of the coordinate system of this blade (15) is defined.

The X axis (1) is defined as an axis that is perpendicular to the circular section (4) and passes through the origin G, said axis coinciding with the longitudinal axis of the blade.

A Y axis (2) is defined as an axis that is perpendicular to the X axis (1) that passes through the origin G and is parallel to the AB plane (5).

A Z axis (3) is defined as an axis that is perpendicular to the preceding X axis and Y axis (1, 2) and passes through the origin G.

The coordinate system GXYZ of this blade (15) is thereby completely defined.

In order to have an absolute reference for the position of the blades (15) of the wind turbines (11), said blades (15) are electronically positioned with a known control angle of attack. This is done with the blades (15) of all the wind turbines (11) before measuring, regardless of the position in which they are located. To that end, the blades (15) of the model wind turbine (10) are initially positioned with the electronic controller at a known control angle of attack. This is the initial position of the blades (15) of the model wind turbine (10). This value is subsequently transferred to the rest of the wind turbines (11) in the farm, such that all the wind turbines (11) are initially positioned with the same control angle of attack before starting to measure.

The angle of attack of the blade (15) at any one distance (D) from the origin G along the X axis (1) of the blade (15) is then measured. There may be two situations for taking this measurement:

1. —A first situation in which the distance (D) at which the section of the blade (15) is located with a known angle of attack is known from the manufacturing plans for the blade (15). Measurements of points are then taken along the blade (15) at this distance (D), such that the section of the blade (15) in which the known angle of attack is located is obtained. Once the section of the blade (15) has been obtained, the leading edge (21) and trailing edge (22) of the blade (15) are of particular interest.

Again there can be two different situations for finding the chord (7) of the blade (15): the blade (15) is either symmetrical or asymmetrical.

1.1—If the blade (15) is symmetrical, the chord (7) joins a point (27) of the leading edge (21) with the trailing edge (22) and coincides with the axis of symmetry of this section.

1.2. —If the blade (15) is asymmetrical, the chord (7) is obtained by plotting on the section of the blade (15) an arc of circumference with its center in the trailing edge and with a radius equal to the length of the chord (7) marked in the plans of the wind turbine (11). The chord (7) is the line going from this center to the cut-off point of the mentioned arc of circumference with the circumference (6) of the leading edge.

2. —The second situation arises in the case in which the section of the blade (15) in which the angle of attack is known is unknown, or there are no plans available in which this information can be found. Measurements are then taken at the distance (D) in which the chord (7) of the blade (15) has a maximum length in order to thus increase measurement precision. Either the chord (7) or else a reference straight line (25) is calculated at this distance (D) in the section of the blades (15).

2.1.—In the case of calculating the chord (7), the method can proceed if the blade (15) is symmetrical. In this case, the chord (7) is the axis of symmetry of the blade (15), so it is thereby defined. If the blade (15) is asymmetrical, the chord (7) cannot be calculated through measurements, and the method proceeds according to the case of calculating a reference straight line (25) which is described in the following point. This reference straight line (25) will be obtained in the same way in all blades (15).

2.2. —In the case of calculating a reference straight line (25), two known points of the section of the blade (15) are used. The first of these points (24) is the point where the X axis (1) intersects the section of the blade (15), or in other words, the projection of the origin G in the section of the blade (15).

There may be two situations to calculate the second point.

2.2.1.—For the first case, in which the leading edge (21) is a circular line, the other point (23) is the center of the circumference (6) of the leading edge.

Measurements of at least three points of the leading edge (21) are taken to obtain this center (23), such that this circumference (6) is defined.

2.2.2.—The second case occurs when the blade (15) is manufactured by means of the longitudinal attachment of two shells. For this case, since the leading edge (21) is a non-circular line, the second point (26) is the point of tangency of a circumference plotted from the previous point (24) with the leading edge (21) of the blade (15).

Therefore, once these two points (24, 23, 26) are defined, a reference straight line (25) is completely defined in the section of the blade (15).

Once either a chord (7) or a reference straight line (25) has been defined in the section of the blade (15) at the distance (D) from the origin G according to the X axis (1), the angle formed with the Y axis (2) is determined. This is the angle ($\alpha$) used as a reference to position all the blades (15) of each wind turbine (11) subject to improvement and on the basis of which the angle of attack is obtained. The relative deviation of each blade (15) with respect to others in the same wind turbine (11) can be known with these measurements.

To determine the value to which the reference angle ($\alpha$) of the blades (15) subject to improvement must be adjusted, the same measurement is taken in the wind turbine (10) that is generating maximum power and is defined as the model wind turbine. The value of the reference angle ($\alpha$) in each blade (15) of this model wind turbine (10) is determined. In the case in which two blades (15) of this model wind turbine (10) have the same value as the reference angle ($\alpha$), said reference angle ($\alpha$) is defined as the value of the model reference angle ($\alpha_m$). In the case in which the reference angle ($\alpha$) of all the blades (15) is different, the value of the arithmetic mean of all of them is defined as the value of the model reference angle ($\alpha_m$).

The value of this model reference angle ($\alpha_m$) is then transferred to the rest of the blades (15) object of improvement. Each blade (15) is rotated about its longitudinal axis, i.e., the X axis (1), for the purpose of changing the value of the reference angle ($\alpha$) to the value of the aforementioned model reference angle ($\alpha_m$).

All the blades (15) of the wind turbine (11) are thereby placed in the same relative position, or in other words, they have the same value of the angle of attack, which is the same as that of the model wind turbine (10) that generates maximum power.

Once the blades (15) of a wind turbine (11) are positioned, the same method is followed for the rest of the wind turbines (11) in the farm provided that they are the same type. It can thereby be assured that all the blades (15) of each wind turbine (11) are placed in the same relative position identical to that of the model wind turbine (10) that works with maximum yield.

The invention claimed is:

1. A method for calculating and correcting the angle of attack of a blade in a wind turbine of a farm comprising a plurality of wind turbines, each wind turbine comprising:
   a tower,
   a nacelle,
   a hub,
   blades,
   and wherein
   a model wind turbine is defined as the wind turbine that generates maximum power from among all the wind turbines of the farm,
   a coordinate system GXYZ is created in a first blade of the model wind turbine comprising:
      measuring, using a laser connected to an electronic data processing system, at least three points of the front face of the nacelle where it is attached to the hub, defining an AB plane,
      measuring, using a laser connected to the electronic data processing system, at least three points of the circumferential contour of attachment of the first blade to the hub, defining a circular section the center G of which is the origin of the coordinate system of this first blade,
      defining the X-axis as an axis that is perpendicular to the circular section and passes through the origin G,
      defining the Y-axis as an axis that is perpendicular to the X-axis, that is parallel to the AB plane and passes through the origin G,
      defining a third axis as a Z-axis that is perpendicular to the previously defined X-axis and Y-axis and passes through the origin G, the angle formed between a reference straight line formed by the joining of two points defining the cross-section of the first blade at any one distance (D) from the origin G in the direction of the X axis and the rotor plane of rotation is calculated, obtaining a reference angle ($\alpha$), the angle of attack of the first blade is calculated as the complementary angle of the reference angle ($\alpha$), the reference angle ($\alpha$) is measured in the remaining blades of the model wind turbine, when at least two of the blades of the model wind turbine have the same value as the reference angle ($\alpha$), this value is considered a model reference angle ($\alpha$m), the reference angle ($\alpha$) is measured in a first blade of a new wind turbine at the same distance (D) from the origin G in the direction of the X-axis of this first blade, the value of the reference angle ($\alpha$) of the first blade of the new wind turbine is adjusted until being positioned with the same value of the model reference angle ($\alpha$m) obtained for the model wind turbine.

2. The method according to claim 1, characterized in that a reference coordinate system GXYZ is created in the remaining blades of the model wind turbine, such that a coordinate system is defined in each blade of the model wind turbine.

3. The method according to claim 1, characterized in that the any distance (D) from the origin G on the X-axis of the first blade at which there is located the cross-section in which a value of the reference angle ($\alpha$) is known is provided in the plans of the wind turbine.

4. The method according to claim 1, characterized in that if the cross-section of the first blade is symmetrical, the two points are a point belonging to the leading edge of the blade and the trailing edge of the blade, the straight line joining these two points being the chord, coinciding with the axis of symmetry of the blade.

5. The method according to claim 1, characterized in that if the cross-section of the first blade is asymmetrical, the chord is obtained by plotting on the section of the first blade an arc of circumference with its center in the trailing edge and with a known radius, the resulting chord being the line going from this center to the cut-off point of the arc of circumference with the circumference of the leading edge.

6. The method according to claim 1, characterized in that if the cross-section of the first blade is asymmetrical, two points at the any distance (D) from the origin G on the X-axis of the first blade in a cross-section are measured in order to calculate a reference straight line, and said points are:

the center of the circumference of the leading edge in the cross-section of the first blade, and the point of this section belonging to the X-axis, or projection of the origin G in this section, such that said reference straight line defines a reference angle ($\alpha$) with the rotor plane of rotation the complementary angle of which is the angle of attack of the first blade.

7. The method according to claim 1 for the case in which the blades are formed by means of the longitudinal attachment of two shells, characterized in that a reference straight line at distance (D) from the origin G is obtained in the cross-section of the blade, defined by:

the point of said cross-section belonging to the X-axis, or in other words, the projection of the origin G in this section, and the point of tangency of a plotted circle from the preceding point with the leading edge of the blade, such that said reference straight line defines a reference angle ($\alpha$) with the rotor plane of rotation the complementary angle of which is the angle of attack of the first blade.

8. The method according to claim 1, characterized in that:

the reference angle ($\alpha$) is measured in the remaining blades of the model wind turbine, when all the blades of the model wind turbine have values other than the reference angle ($\alpha$), it is considered a model reference angle ($\alpha_m$) given by the arithmetic mean of the values of the reference angles ($\alpha$) calculated for all the blades of the model wind turbine.

9. The method according to claim 1, characterized in that the reference angle ($\alpha$) is measured in the rest of the blades of the new wind turbine at the same distance (D) from the origin G in the direction of the X-axis of each of the remaining blades.

10. The method according to claim 9, characterized in that the value of the reference angle ($\alpha$) of the rest of the blades of the new wind turbine is adjusted until being positioned with the same value of the model reference angle ($\alpha_m$) obtained for the model wind turbine.

11. The method according to claim 10, characterized in that the value of the reference angle ($\alpha$) of all the blades of the rest of the wind turbines of the wind farm is measured and adjusted until being positioned with the same value of the model reference angle ($\alpha_m$) obtained for the model wind turbine.

* * * * *